INVENTORS
FRANK P. GRAY
ABE D. PENN
ATTORNEYS

United States Patent Office 3,279,587
Patented Oct. 18, 1966

3,279,587
SPRING BELT CONVEYOR ASSEMBLY AND ROLLER THEREFOR
Frank P. Gray, 2600 E. Flora Place, and Abe D. Penn, 140 S. Eudora St., both of Denver, Colo.
Filed Apr. 30, 1964, Ser. No. 363,820
2 Claims. (Cl. 198—190)

This invention relates to spring belt conveyors and, more specifically, to improved grooved rollers therefor.

Conveyors having a plurality of grooved cylindrical rollers operatively interconnected by a plurality of endless close-wound helical spring belts have been in widespread use for many years with good results. The usual unit has wooden rollers of uniform diameter from end-to-end thereof except for the grooves which are annular and arranged in side-by-side parallel relation.

Conveyors of this type have, perhaps, found their widest application in the movement of delicate packages, particularly bags, that break open rather easily and have more or less irregular shapes that are not easily accommodated on other styles of conveyors. One problem with these units is the tendency for the conveyed articles to gradually migrate toward the edges where they are likely to fall off and break open. Also, spring belt conveyors have been known to skew bags so that they arrive at the discharge end poorly aligned making them difficult to handle with automatic unloading equipment. Improperly loaded bags, likewise, remain misaligned or become more so because no provision is made for straightening them out.

The foregoing problems could be eliminated by "troughing" the conveying surface as this would prevent the conveyed articles from migrating toward the edges and also provide the added advantage of straightening skewed bags. The obvious way of accomplishing this desirable end is to make the series of spring belts interconnecting each pair of adjacent rollers of different lengths so that the ones on the outboard ends would be tight or stretched and under tension while the inboard ones would be progressively longer toward the center thus introducing a moderate amount of slack. There are, however, some serious problems connected with this approach.

To begin with, the expense and inventory problems associated with producing a specific chain belt size for each roller groove becomes impractical. Secondly, the various belts by reason of their different lengths will not grip the rollers with the same degree of frictional engagement and those at or near the center are likely to slip. The latter results in increased roller wear and may even cause the unit to fail to perform its primary function, namely, the movement of conveyed material.

It has now been found in accordance with the teaching of the instant invention that these and other desirable ends can be accomplished quite simply and without the attendant problems by redesigning the grooved roller so that the surface thereof takes the form of two opposed intersecting conical surfaces. When this is done, each groove from the center outward has an effective radius of fixed increment larger than the next smaller one. Then, by using belts of the same length, the outboard belts are automatically under greater tension than the inboard ones and the weight of the conveyed article will cause each of the belts to stretch a different amount to produce the necessary "troughed" conveying surface. The length of all belts is selected such that the one spanning the centermost grooves of adjacent rollers is tensioned to the point where it will drive without slipping. Then, of course, all the remaining belts will be under greater tension because of the greater groove radii at the points where they pass around the rollers. The net result is that the belts in the central part of the conveyor will sag most under the weight of the conveyed article and produce a trough that keeps the articles centered and also tends to align those that have become misaligned.

Intimately associated with the tension in the individual belts is the combined belt load on each roller. All the prior art rollers have an equal number of belt grooves so that the same number of belts are reeved from an intermediate roller to the roller ahead as extend to the one behind. Due, however, to the alternating belt arrangement, each roller has an extra belt on one end and a blank space on the other which produces an unequal loading that tends to skew the rollers, enhances the tendency for the conveyed articles to migrate toward the edges and even necessitates the inclusion of special equipment on all flexible units to prevent the rollers from moving out of their ideal parallel or radial positions relative to one another.

Another significant functional advantage brought about by the above-described structure is the flattening effect it has on material in bags. After a bag has been filled, the material is usually packed into the bottom leaving the top substantially empty and the center swelled until it is almost round. Such packages are difficult to handle and especially to stack. Machines have been developed for the sole purpose of flattening "bagged" material because it presents such a problem. The instant invention, on the other hand, results in a flattening action much like that of a rolling pin which distributes the material uniformly from end-to-end and side-to-side as the package progresses along the conveyor. At each roller, the filled bag rides up and over with the roller redistributing the material to produce a flattened package.

It is, therefore, the principal object of the present invention to provide a novel and improved chain belt conveyor assembly having a troughed conveying surface.

A second objective of the invention herein claimed is the provision of an improved chain belt conveyor roller having opposed intersecting frusto-conical end portions and an odd number of belt-receiving grooves.

Another object is to provide a spring belt-grooved roller combination that results in the belts having varying degrees of tension even though of the same length.

Still another objective is to provide a roller made of cast metal that is lightweight, rugged and will not wear out as rapidly as the wooden rollers heretofore used.

An additional object is to provide a bag-flattening spring belt conveyor that maintains the conveyed articles centered thereon while straightening those that may have become misaligned.

Further objects are to provide a spring belt conveyor roller that is simple, rugged, inexpensive, trouble-free, easy to install, precise and decorative in appearance.

Other objects will be in part apparent and in part pointed out specifically hereinafter in connection with the description that follows, and in which.

Figure 1:
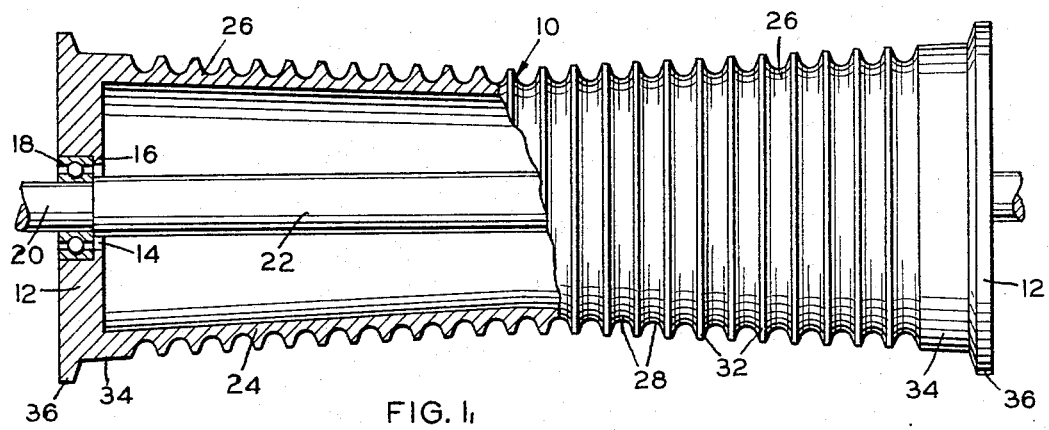
FIGURE 1 is an elevation to an enlarged scale showing the improved spring belt roller of the present invention journalled for rotation on an axle, portions of the roller having been broken away to reveal the interior.

Referring now to the drawings for a detailed description of the invention and, initially, to FIGURE 1 for this purpose, the roller which has been designated in a general way by reference numeral 10 can be seen to include a pair of integrally-cast circular end plates 12 with central openings 14 therein bounded by annular shoulders 16 that retain roller bearings 18. Sections 20 of reduced diameter on the ends of axle 22 are journalled within the bearings in the conventional manner.

Spanning the distance between the end plates 12 is a hollow shell 24 that comprises the roller surface. In the prior art spring belt rollers, this surface is cylindrical but, in accordance with the teaching of the instant invention, the shell 24 is tapered from both ends toward the center to produce a pair of opposed frustoconical sections 26. Thus, the diameter of the roller increases steadily and uniformly from the center outwardly except for the spring belt grooves 28 in its outer surface.

Grooves 28 are semicircular, all of the same depth and radius as each accommodates a spring belt 30 of identical construction. These grooves are continuous and annular arranged in uniformly spaced parallel relation to one another with narrow lands 32 therebetween. Adjacent each end a relatively narrow smooth conical band 34 separates the grooved portion from an annular rim or head 36 as shown.

The rollers are preferably fabricated from aluminum or an alloy thereof which can be die-cast thus vastly simplifying the production when compared with turning wooden rollers as has been done in the past. Generally, two half-sections are made in the same mold and subsequently joined together by techniques well known in the art.

Figure 2:
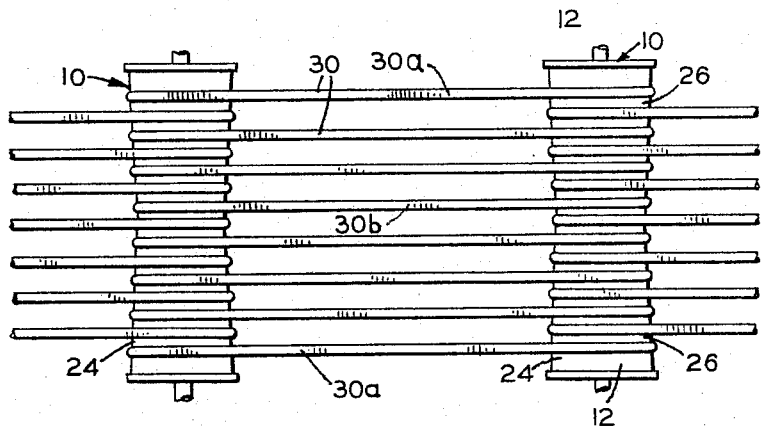
FIGURE 2 is a top plan view showing a pair of the rollers in place and operatively interconnnected in driving relation by a plurality of endless spring belts; and, FIGURE 3 is a longitudinal section showing the "troughing" and "bag-flattening" action of the assembly.
Figure 3:
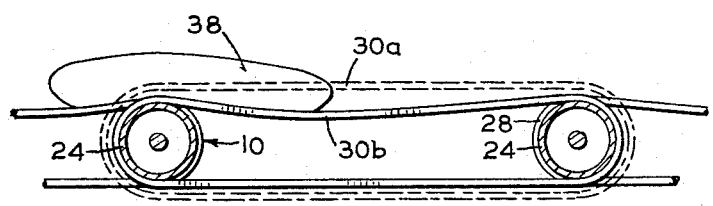

Next, with reference to FIGURES 2 and 3, it will be seen that while the axes of rotation of any two adjacent parallel rollers are the same distance apart, the grooved-roller surfaces over which the spring belts roll are not. Thus, in FIGURE 3, the dotted lines represent the configuration of one of the outboard spring belts 30a as it is reeved in the endmost grooves while the full lines show the shape of the centermost belt 30b within grooves of substantially smaller radius.

Now, with all the endless spring belts of the same length, it becomes apparent that the outside belts 30a will be tensioned to a greater degree than the inside belts 30b, however, all are tensioned to some degree to prevent slippage. Thus, with the conveyor unloaded, the spring belt conveying surface will comprise a pair of downwardly and inwardly sloping planes which, in and of themselves, will form a trough capable of keeping the conveyed articles in the center thereof and tending to align any that have become misaligned. This troughing effect becomes more pronounced and beneficial when the conveyor is loaded because the belts under the least tension will sag or stretch most as shown in FIGURE 3. In addition, however, the unsupported portions of the belts lying between the rollers will drop down below roller level making the material being conveyed such as bag 38 progress with a wave-like motion as it passes over each roller in turn and drops down onto the sagging belts therebetween. The rollers then perform a "rolling-pin" action to redistribute the material within the bag and flatten the package for easy stacking and handling.

Finally, with specific reference to FIGURE 2 it will be seen that both rollers 10 have an odd number of belt-receiving grooves 28 so that an odd number of belts extend in one direction therefrom and an even number in the opposite direction. Thus, while there are eight spring belts tending to pull the two rollers shown toward one another and only seven belts acting on each roller that tend to pull them apart, these inequalities are unimportant when compared with the distinct advantage of having each roller loaded symmetrically about its midpoint. In other words, the provision of an uneven number of grooves with one groove in the exact center of the roller assures the fact that the rollers will not tend to skew into a position such that their axes of rotation are no longer parallel even though the belts remain parallel as would occur if one of the outside belts 30a were removed.

Having thus described the several useful and novel features of the spring-belt and roller assembly of the present invention it will become apparent that the many worthwhile objectives for which it was developed have been achieved. Although but a single specific embodiment has been illustrated and described in detail, we realize that certain changes and modifications therein may well occur to those skilled in the art within the broad teaching hereof; hence, it is our intention that the measure of protection afforded hereby shall be limited only insofar as said limitations are expressly set forth in the appended claims.

What is claimed is:

1. In combination in a power driven spring belt conveyor; at least three rollers journalled for rotation in fixed spaced parallel relation, each of said rollers tapering inwardly from each end toward the center to provide a pair of opposed intersecting frusto-conical surfaces, and said intersecting frusto-conical surfaces each being provided with a plurality of continuous annular spring belt grooves arranged in side-by-side parallel relation, each groove from the center outward having an effective radius of fixed increment larger than the next smaller one; a plurality of endless close-wound helical spring belts reeved in the grooves of the middle roller alternately to the longitudinally aligned grooves of one of the rollers on either side thereof, said belts and rollers cooperating to provide a resilient troughed conveying surface, said spring belts interconnecting each pair of adjacent rollers being of the same length, the length of said belts being selected to place all of them under sufficient tension to eliminate slippage, and in which each belt from the center of the conveying surface outward in both directions is under successively greater tension due to the steadily increasing roller diameter toward the ends thereof, said differing belt tensions allowing the inside belts to sag more under load than the outside belts thus deepening the trough in the conveying surface between rollers beyond that which said conveying surface possesses when unloaded.

2. The combination as set forth in claim 1 in which: each roller has the same uneven number of belt-receiving grooves, one of said grooves being in the center with the same even number of grooves equally spaced on either side of said center groove.

References Cited by the Examiner
UNITED STATES PATENTS

| | | | |
|---|---|---|---|
| 636,762 | 11/1899 | Conley | 198—190 X |
| 807,916 | 12/1905 | Edmund | 198—190 X |
| 2,260,587 | 10/1941 | Shields | 198—190 X |
| 2,725,974 | 12/1955 | Shields | 198—190 |
| 3,002,618 | 10/1961 | Derderian et al. | 198—190 X |

EVON C. BLUNK, *Primary Examiner.*

SAMUEL F. COLEMAN, *Examiner.*

R. E. KRISHER, *Assistant Examiner.*